(12) United States Patent
Ben-Haim et al.

(10) Patent No.: US 9,532,239 B2
(45) Date of Patent: Dec. 27, 2016

(54) WIRELESS NETWORK LOCATION TECHNIQUES

(71) Applicant: Intel IP Corporation, Santa Clara, CA (US)

(72) Inventors: Shani Ben-Haim, Haifa (IL); Yuval Amizur, Kfar-Saba (IL)

(73) Assignee: INTEL IP CORPORATION, Santa Clara, CA (US)

( * ) Notice: Subject to any disclaimer, the term of this patent is extended or adjusted under 35 U.S.C. 154(b) by 161 days.

(21) Appl. No.: 14/129,949

(22) PCT Filed: May 29, 2013

(86) PCT No.: PCT/US2013/043132
§ 371 (c)(1),
(2) Date: Dec. 28, 2013

(87) PCT Pub. No.: WO2014/130070
PCT Pub. Date: Aug. 28, 2014

(65) Prior Publication Data
US 2014/0301219 A1    Oct. 9, 2014

Related U.S. Application Data

(60) Provisional application No. 61/766,322, filed on Feb. 19, 2013.

(51) Int. Cl.
*H04W 24/02* (2009.01)
*G01S 5/14* (2006.01)
(Continued)

(52) U.S. Cl.
CPC ............... *H04W 24/02* (2013.01); *G01S 5/14* (2013.01); *G01S 13/765* (2013.01); *G01S 13/876* (2013.01); *H04L 43/08* (2013.01)

(58) Field of Classification Search
None
See application file for complete search history.

(56) References Cited

U.S. PATENT DOCUMENTS 5,510,800 A    4/1996   McEwan
9,060,343 B2 *  6/2015   Hwang et al.
(Continued)

OTHER PUBLICATIONS

International Search Report and Written Opinion, Mailed Date: Nov. 26, 2013, Application No. PCT/US2013/043132, Filed Date: May 29, 2013, pp. 15.

(Continued)

*Primary Examiner* — Michael Thier
*Assistant Examiner* — Eric Nowlin

(57) ABSTRACT

Improved wireless network location techniques are described. In one embodiment, for example, an apparatus may comprise circuitry and a communications management module for execution on the circuitry to send a timing announcement element comprising a sounding preamble count parameter indicating a number of sounding preambles, send a null data element comprising a number of sounding preambles equal to the sounding preamble count parameter, receive timing reply information comprising the number of sounding preambles equal to the sounding preamble count parameter, and determine a time of flight based on the timing reply information. Other embodiments are described and claimed.

24 Claims, 12 Drawing Sheets

(51) Int. Cl.
*H04L 12/26* (2006.01)
*G01S 13/76* (2006.01)
*G01S 13/87* (2006.01)

(56) References Cited

U.S. PATENT DOCUMENTS

| | | |
|---|---|---|
| 2007/0184864 A1 | 8/2007 | Leitch et al. |
| 2008/0043681 A1 | 2/2008 | Vimpari et al. |
| 2010/0111215 A1* | 5/2010 | Nandagopalan ..... H04B 7/0617 375/267 |
| 2010/0150117 A1 | 6/2010 | Aweya et al. |
| 2011/0013607 A1* | 1/2011 | Van Nee ............. H04L 27/2613 370/338 |
| 2011/0075607 A1* | 3/2011 | Kim ..................... H04B 7/0417 370/328 |
| 2011/0096796 A1* | 4/2011 | Zhang ................. H04B 7/0669 370/474 |
| 2011/0110338 A1 | 5/2011 | Khoryaev et al. |
| 2012/0294112 A1 | 11/2012 | Pearce et al. |
| 2012/0300874 A1* | 11/2012 | Zhang .......................... 375/295 |
| 2014/0160947 A1* | 6/2014 | Du et al. ...................... 370/252 |

OTHER PUBLICATIONS

Office Action and Search Report received for Taiwanese Patent Application No. 103103161, mailed Jun. 30, 2015, 16 pages including 1 page English translation.

* cited by examiner

WIRELESS NETWORK LOCATION TECHNIQUES

RELATED CASE

This application claims priority to U.S. Provisional Patent Application No. 61/766,322, filed on Feb. 19, 2013, the entirety of which is hereby incorporated by reference.

TECHNICAL FIELD

Embodiments described herein generally relate to device location techniques for wireless communications networks.

BACKGROUND

In order to determine location information for a particular device in a wireless communications network, times of flight for communications between the device and other devices in the network may be determined. Based on such times of flight, distances may be estimated between the device and various other devices that may have known locations. These estimated distances may in turn be used to determine an estimated location for the particular device in question. In order to simplify the implementation of such techniques for determining location information, the times of flight may be determined via the exchange of information elements conforming to existing defined formats.

DETAILED DESCRIPTION

Various embodiments may be generally directed to improved wireless network location techniques. In one embodiment, for example, an apparatus may comprise circuitry and a communications management module for execution on the circuitry to send a timing announcement element comprising a sounding preamble count parameter indicating a number of sounding preambles, send a null data element comprising a number of sounding preambles equal to the sounding preamble count parameter, receive timing reply information comprising the number of sounding preambles equal to the sounding preamble count parameter, and determine a time of flight based on the timing reply information. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
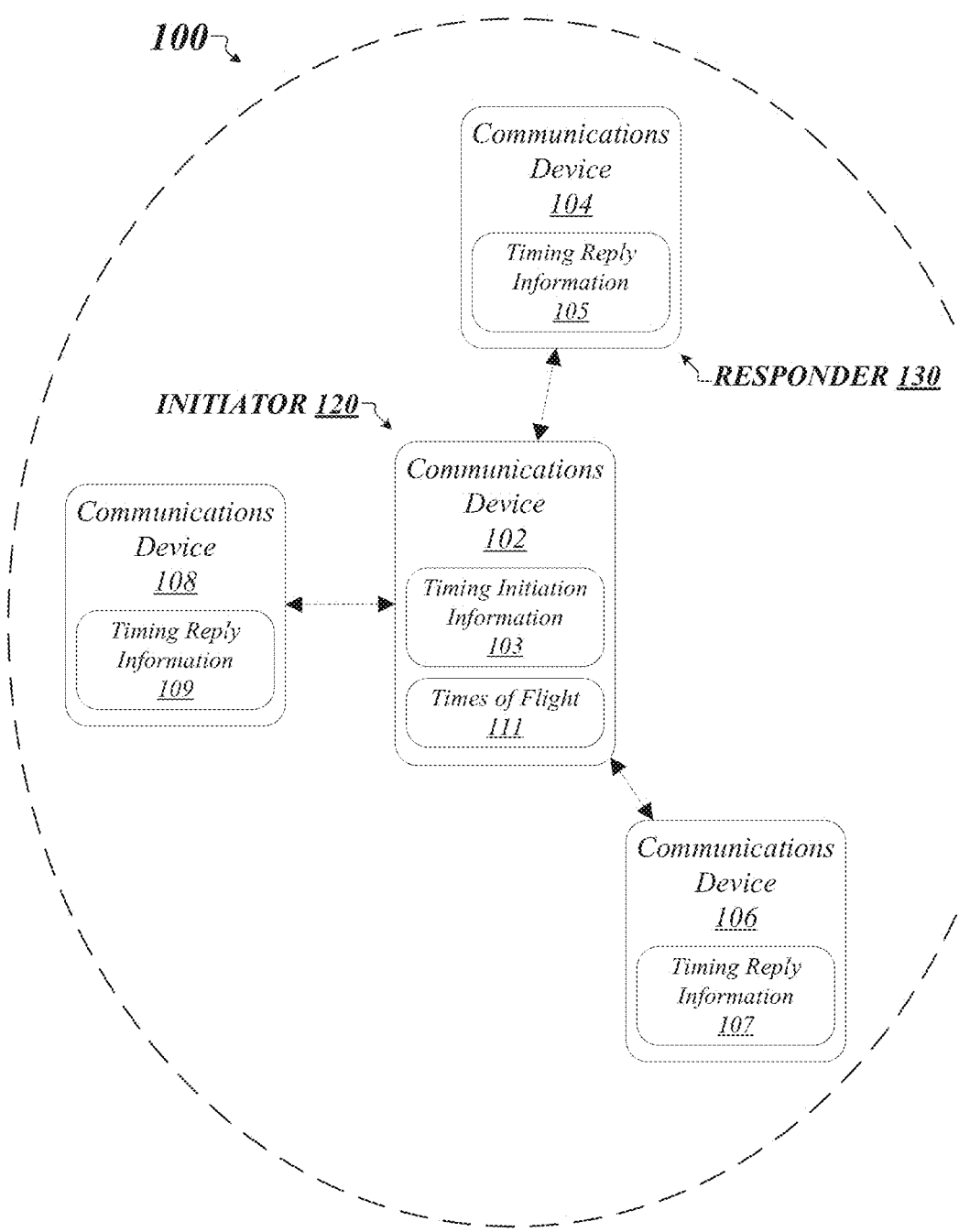
FIG. 1 illustrates one embodiment of a wireless communications network.

FIG. 1 illustrates an example of a wireless network 100 such as may comprise an operating environment for various embodiments. As shown in FIG. 1, a communications device 102 is operative to communicate with communications devices 104, 106, and 108 over wireless network 100. Examples of wireless network 100 according to various embodiments may include a wireless local area network (WLAN), a wireless personal area network (WPAN), a wireless metropolitan area network (WMAN), a cellular communications network, and a satellite communications network. The embodiments are not limited to these examples.

In some embodiments, wireless network 100 may operate according to one or more wireless communications standards. For example, in various embodiments, wireless network may operate according to Institute of Electrical and Electronics Engineers (IEEE) Standard 802.11™-2012, published Mar. 29, 2012, titled "Part 11: Wireless LAN Medium Access Control (MAC) and Physical Layer (PHY) Specifications" ("IEEE 802.11-2012") and/or according to IEEE Draft Standard 802.11ac™/D5.0 published Feb. 1, 2013 ("IEEE 802.11ac Revision 5.0") or according to any predecessors, revisions, or variants thereof. Hereinafter, for purposes of brevity, embodiments comprising a wireless network operating according to IEEE 802.11-2012 and/or IEEE 802.11ac Revision 5.0 or any predecessors, revisions, or variants thereof shall be referred to as "802.11" embodiments. It is to be understood that embodiments are both possible and contemplated that do not comprise a wireless network operating according to either IEEE 802.11-2012, IEEE 802.11ac Revision 5.0, or any predecessor, revision, or variant thereof, and that the embodiments are not limited in this context.

In some embodiments, communications device 102 may be operative to communicate with communications devices 104, 106, and 108 in order to determine a location of communications device 102. More particularly, communications device 102 may be operative to communicate with communications devices 104, 106, and 108 in order to determine times of flight 111 for communications between communications device 102 and communications devices 104, 106, and 108. With respect to any particular communication comprising a wireless signal, the term "time of flight" is employed herein to denote an amount of time taken for the wireless signal to travel a distance through a medium, such as from a transmitter through air to a receiver. Based on the determined times of flight 111, communications device 102 and/or one or more other devices communicating over wireless network 100 may estimate respective distances between communications device 102 and communications devices 104, 106, and 108, and estimate a location of communications device 102 based on those estimated distances, such as by triangulation, for example. It is worthy of note that although communications device 102 is illustrated as communicating with three communications devices 104, 106, and 108 in the example of FIG. 1, the embodiments are not limited to this example. In some embodiments, communications device 102 may be operative to communicate with and/or determine times of flight 111 corresponding to smaller or larger numbers of other communications devices, and the embodiments are not limited in this context.

As shown in FIG. 1, communications device 102 may be operative to send timing initiation information 103 to each of communications devices 104, 106, and 108. It is worthy of note that in various embodiments, communications device 102 may be operative to send different timing initiation information 103 to each of communications devices 104, 106, and 108, while in other embodiments, communications device 102 may be operative to send the same timing initiation information 103 to multiple communications devices 104, 106, and 108. In response to received timing initiation information 103, communications devices 104, 106, and 108 may send respective timing reply information 105, 107, and 109 to communications device 102. Communications device 102 and/or one or more other devices communicating over wireless network 100 may then be operative to determine times of flight 111 based on the timing reply information 105, 107, and 109 received by communications device 102.

Herein, the term "initiator" shall be employed to denote a communications device that sends timing initiation information 103 to initiate a process to determine times of flight 111, and the term "responder" shall be employed to denote a communications device that responds to such timing initialization information 103 with timing reply information 105. For example, as illustrated by the labels in FIG. 1, communications device 102 may comprise an initiator 120 and communications device 104 may comprise a responder 130. It is to be understood that in the example of FIG. 1, communications devices 106 and 108 may also comprise responders, and that communications device 104 is labeled as responder 130 simply for ease of reference below. It is worthy of note that in some embodiments, a particular communications device may be capable of operation as both an initiator and a responder. For example, although communications device 102 operates as an initiator 120 in the example of FIG. 1, communications device 102 may also or alternately operate as a responder 130 within that same wireless network 100. The embodiments are not limited in this context.

Figure 2:
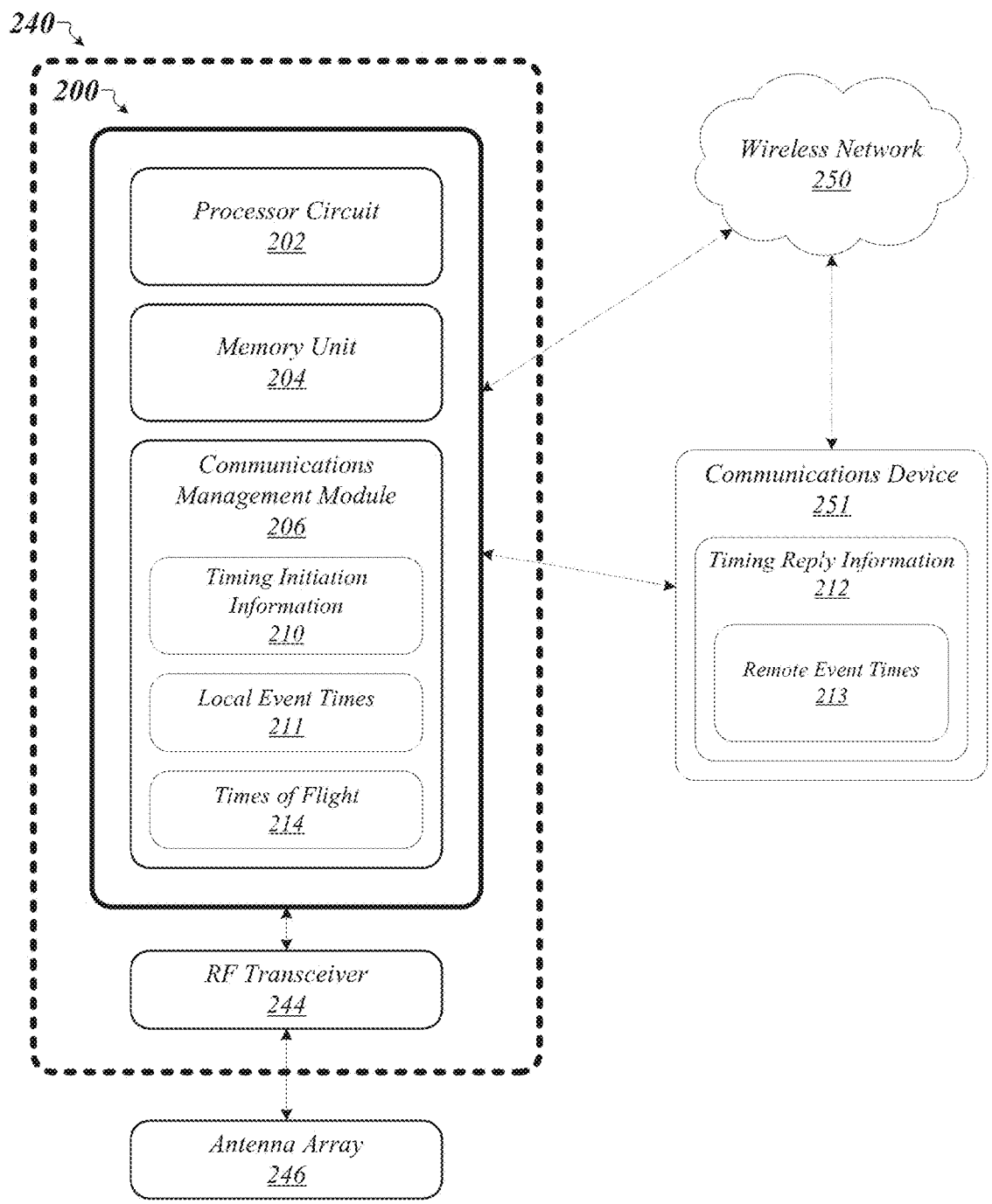
FIG. 2 illustrates one embodiment of a first apparatus and one embodiment of a first system.

FIG. 2 illustrates a block diagram of an apparatus 200. More particularly, apparatus 200 may comprise an example of initiator 120 of FIG. 1 according to various embodiments. As shown in FIG. 2, apparatus 200 comprises multiple elements including a processor circuit 202, a memory unit 204, and a communications management module 206. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In some embodiments, apparatus 200 may comprise communications management module 206. Communications management module 206 may comprise logic, circuitry, and/or instructions operative to manage and/or configure communications by apparatus 200 over a wireless network 250. In various 802.11 embodiments, wireless network 250 may comprise an 802.11 wireless network, and communications management module 206 may be operative to manage and/or configure communications by apparatus over that 802.11 wireless network. In some embodiments, communications management module 206 may be operative to manage and/or configure only communications by apparatus 200 over wireless network 250. In various other embodiments, communications management module 206 may be operative to manage and/or configure communications by apparatus 200 over one or more other networks in addition to communications by apparatus 200 over wireless network 250. The embodiments are not limited in this context.

FIG. 2 also illustrates a block diagram of a system 240. System 240 may comprise any of the aforementioned elements of apparatus 200. System 240 may further comprise a radio frequency (RF) transceiver 244. RF transceiver 244 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 244 may operate in accordance with one or more applicable standards in any version. In some embodiments, wireless network 250 may comprise an 802.11 wireless network, and RF transceiver 244 may be operative to transmit and/or receive one or more signals over wireless network 250 according to IEEE 802.11-2012 and/or IEEE 802.11ac Revision 5.0, and/or according to any predecessors, revisions, or variants thereof. The embodiments are not limited in this context.

In various embodiments, RF transceiver 244 may be coupled to an antenna array 246 comprising one or more antennas. In some embodiments, RF transceiver 244 may be operative to transmit and/or receive one or more signals over wireless network 250 via antenna array 246. In various embodiments, RF transceiver 244 may be operative to utilize antenna array 246 to simultaneously transmit and/or receive multiple sounding preambles. In some embodiments, RF transceiver 244 may be operative to transmit multiple sounding preambles in different respective directions using antenna array 246. The embodiments are not limited in this context.

In general operation, apparatus 200 and/or system 240 may be operative to communicate over wireless network 250 in order to determine an estimated location for apparatus 200 and/or system 240. In various embodiments, for example, apparatus 200 and/or system 240 may be operative to send timing initiation information 210 to a communications device 251 over wireless network 250, and to receive timing reply information 212 from the communications device 251 over the wireless network 250. In various such embodiments, apparatus 200 and/or system 240 may be operative to determine times of flight 214 based on the received timing reply information 212, and to utilize the determined times of flight 214 in conjunction with determining an estimated location for apparatus 200 and/or system 240. It is worthy of note that although the example of FIG. 2 depicts a single communications device 251 with which apparatus 200 and/or system 240 communicates over wireless network 250, the embodiments are not so limited. In some embodiments, apparatus 200 and/or system 240 of FIG. 2 may be operative to send timing initiation information 210 to multiple different communications devices over wireless network 250, and/or to receive timing reply information 212 from multiple communications devices over wireless network 250. The embodiments are not limited in this context.

Hereinafter, the term "timing information exchange" shall be employed to denote the collective operations comprising the transmission of particular timing initiation information such as timing initiation information 210 to a communications device such as communications device 251, and the receipt of timing reply information such as timing reply information 212 from that communications device in response to the timing initiation information. In various embodiments, apparatus 200 and/or system 240 may be operative to perform a series of timing information exchanges with communications device 251, and/or with one or more other communications devices, over wireless network 250. The embodiments are not limited in this context.

In some embodiments, during each timing information exchange, communications management module 206 may be operative to determine one or more local event times 211. In various embodiments, local event times 211 may comprise times at which apparatus 200 and/or system 240 sent or received particular transmissions during that timing information exchange. For example, for a given timing information exchange, communications management module 206 may be operative to determine a first local event time 211 indicating a time at which transmission of timing initiation information 210 commenced and may be operative to determine a second local event time 211 indicating a time at which receipt of timing reply information 212 was completed. The embodiments are not limited in this context.

In some embodiments, the timing reply information 212 that apparatus 200 and/or system 240 receives during a given timing information exchange may comprise one or more remote event times 213. In various embodiments, remote event times 213 may comprise times at which communications device 251 sent or received particular transmissions during that timing information exchange. For example, for a given timing information exchange, apparatus 200 and/or system 240 may be operative to receive timing reply information 212 comprising a first remote event time 213 indicating a time at which communications device 251 finished receiving the timing initiation information 210 and comprising a second remote event time 213 indicating a time at which communications device 251 began sending timing reply information 212. In some embodiments, remote event times 213 may alternatively or additionally comprise differences between such times. For example, rather than comprising a first remote event time 213 indicating a time at which communications device 251 finished receiving the timing initiation information 210 and a second remote event time 213 indicating a time at which communications device 251 began sending timing reply information 212, timing reply information 212 may comprise a single remote event time 213 indicating a difference between the times of those two events. The embodiments are not limited in this context.

In various embodiments, during each timing information exchange, apparatus 200 and/or system 240 may alternatively or additionally be operative to receive timing reply information 212 comprising one or more remote event times 213 corresponding to times at which communications device 251 sent or received particular transmissions during a previous timing information exchange. In some such embodiments, during a first timing information exchange in a series, apparatus 200 and/or system 240 may be operative to send timing initiation information 210 requesting the determination of one or more remote event times 213, and may receive timing reply information 212 acknowledging the request but not comprising remote event times 213. During each subsequent timing information exchange in the series, apparatus 200 and/or system 240 may be operative to receive timing reply information 212 comprising remote event times 213 requested in the timing initiation information 210 of the preceding timing information exchange in the series. The embodiments are not limited in this context.

In various embodiments, apparatus 200 and/or system 240 may be operative on RF transceiver 244 and antenna array 246 to transmit timing initiation information 210 comprising multiple sounding preambles, and/or to receive timing reply information 212 comprising multiple sounding preambles. In some such embodiments, apparatus 200 and/or system 240 may be operative on RF transceiver 244 and antenna array 246 to transmit different sounding preambles of timing initiation information 210 in different directions. In some embodiments, apparatus 200 and/or system 240 may be operative to send any one or more particular sounding preambles using a combination of two or more antennas of antenna array 246. The embodiments are not limited in this context.

Figure 3A:
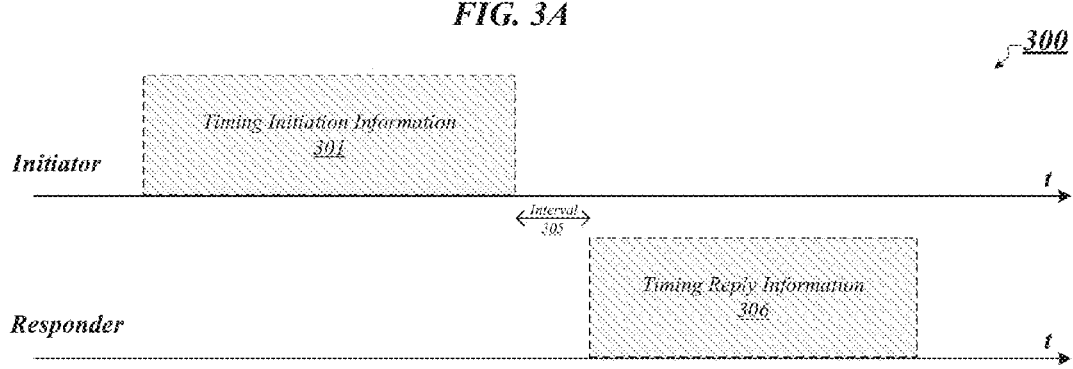
FIG. 3A illustrates one embodiment of a first timing information exchange.

FIG. 3A illustrates a first embodiment 300 of a timing information exchange that may be performed by an initiator and a responder, such as apparatus 200 and/or system 240 and communications device 251 of FIG. 2 respectively, in various embodiments. As shown in FIG. 3A, the initiator sends timing initiation information 301 to the responder. After a time interval 303, the responder sends timing reply information 306 to the initiator in response to the timing initiation information 301. The embodiments are not limited to these examples.

Figure 3B:
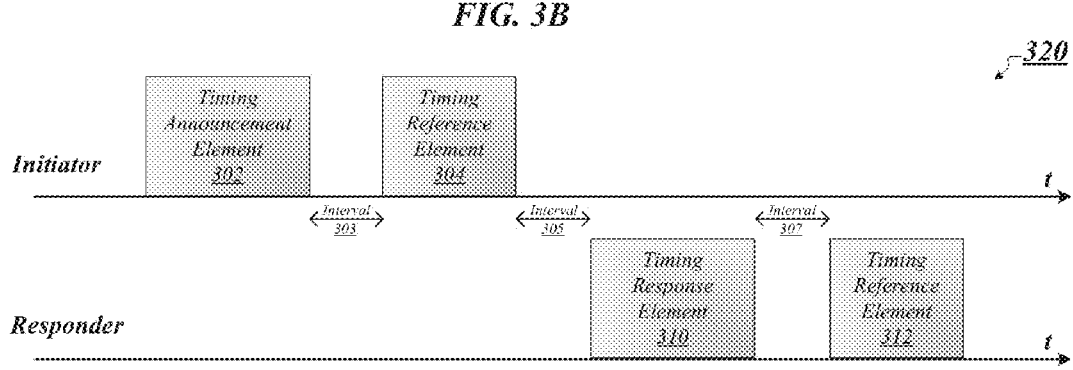
FIG. 3B illustrates one embodiment of a second timing information exchange.

FIG. 3B illustrates a second embodiment 320 of a timing information exchange that may be performed by an initiator and a responder, such as apparatus 200 and/or system 240 and communications device 251 of FIG. 2 respectively, in some embodiments. More particularly, FIG. 3B illustrates elements that may comprise timing initiation information 301 and timing reply information 306 of FIG. 3A in various embodiments. In the timing information exchange of FIG. 3B, the initiator first sends a timing announcement element 302 to the responder. In some embodiments, timing announcement element 302 may comprise logic, information, data, and/or instructions operative to notify the responder that a timing reference element 304 will be sent and to indicate to the responder that a remote event time corresponding to receipt of the timing reference element 304 is desired. In various embodiments, timing reference element 304 may comprise an arbitrary information element in a format defined for use in the determination of times of flight. In some embodiments, timing reference element 304 may comprise a set of one or more sounding preambles. In various embodiments, timing reference element 304 may comprise a null data element. Following a time interval 303, the initiator sends the timing reference element 304 to the responder.

Following a second time interval 305, which may be the same as or different than the time interval 303, the responder sends timing response element 310 to the initiator in response to the timing announcement 302 and/or the timing reference element 304. In some embodiments, timing response element 310 may comprise logic, information, data, and/or instructions operative to acknowledge timing announcement element 302 and timing reference element 304. In various embodiments, timing response element 310 may comprise a remote event time corresponding to receipt of the timing reference element 304. In some embodiments, timing response element 310 may comprise a remote event time corresponding to receipt of a timing reference element 304 during a previous timing information exchange.

In various embodiments, timing response element 310 may indicate that the responder will send a timing reference element 312, which may comprise an arbitrary information element in a same or similar format as timing reference element 304. In various embodiments, timing reference element 312 may comprise a null data element. In some embodiments, timing reference element 312 may comprise a set of one or more sounding preambles. In some embodiments, timing response element 310 may comprise a remote event time indicating a time at which the timing reference element 312 will be sent. In various embodiments, timing response element 310 may comprise a remote event time indicating a time at which a timing reference element 312 was sent during a previous timing information exchange. In some embodiments, timing response element 310 may alternatively or additionally comprise a remote event time indicating a difference between the time of receipt of the timing reference element 304 and the time of transmission of the timing reference element 312 during the current timing information exchange or a previous timing information exchange. Following a third time interval 307, which may be the same as or different than either or both of time intervals 303 and 305, the responder sends the timing reference element 312 to the initiator. Other embodiments are described and claimed.

Figure 3C:
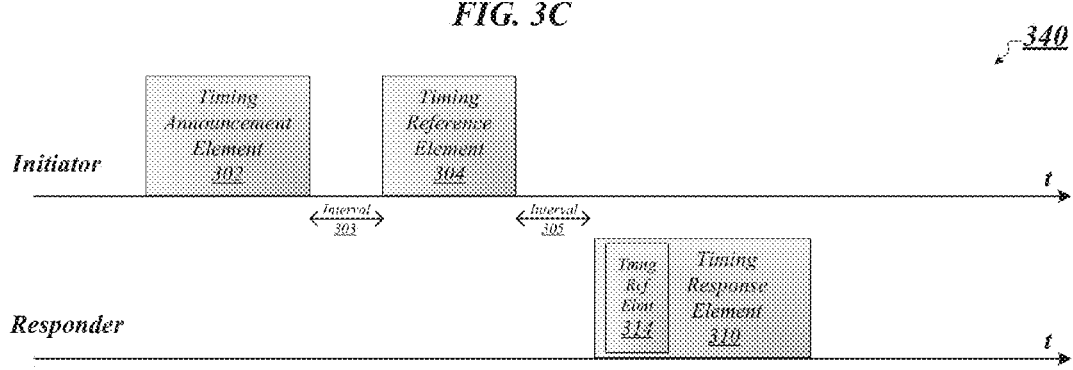
FIG. 3C illustrates one embodiment of a third timing information exchange.

FIG. 3C illustrates a third embodiment 340 of a timing information exchange that may be performed by an initiator and a responder, such as apparatus 200 and/or system 240 and communications device 251 of FIG. 2 respectively, in various embodiments. More particularly, FIG. 3C illustrates an embodiment in which the responder sends a timing response element 310 that contains a timing reference element 314. Unlike the example embodiment of FIG. 3B, in which the responder sends a separate timing reference element 312 following time interval 307, in the example embodiment of FIG. 3C, the responder includes the timing reference element 314 within the timing response element 310. Thus in the example of FIG. 3C, the responder performs only one transmission, while it performs two transmissions in the example of FIG. 3B. In some embodiments, the timing reference element 314 of FIG. 3C may comprise an arbitrary information element of a different format than that of timing reference element 312 of FIG. 3B and/or timing reference element 304 of FIGS. 3B and 3C. In some embodiments, timing reference element 314 may comprise a set of one or more sounding preambles. The embodiments are not limited in this context.

It is worthy of note that the various elements depicted in the example timing information exchange illustrations of FIGS. 3A-3C do not necessarily comprise single spatial streams, nor do they necessarily comprise transmissions exchanged exclusively between the initiator and the responder. For example, in various embodiments, timing reference element 304 may comprise an information element sent by a combination of antennas of antenna array 246 of FIG. 2. In another example, in some embodiments, timing announcement element 302 may comprise an information element broadcast to multiple communications devices using an omnidirectional antenna. The embodiments are not limited in this context.

Figure 4A:
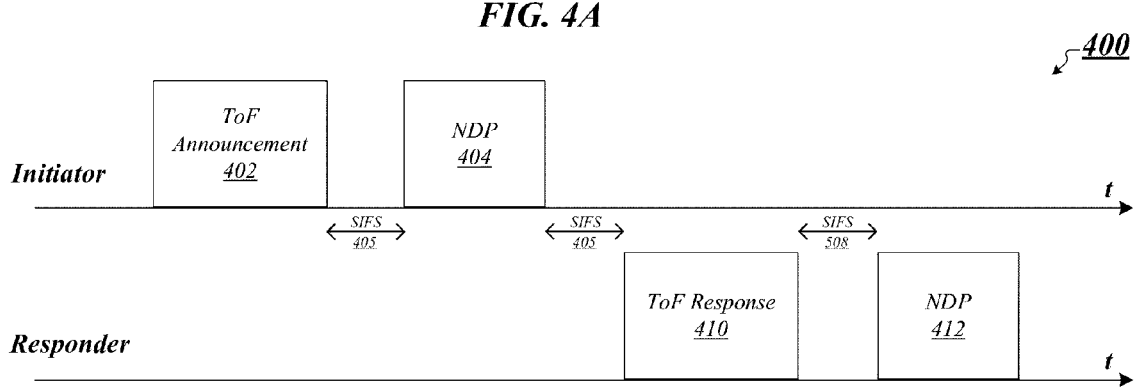
FIG. 4A illustrates one embodiment of a fourth timing information exchange.

FIG. 4A illustrates a fourth embodiment 400 of a timing information exchange that may be performed by an initiator and a responder, such as apparatus 200 and/or system 240 and communications device 251 of FIG. 2 respectively, in various embodiments. More particularly, FIG. 4A illustrates elements that may comprise timing announcement element 302, timing reference element 304, timing response element 310, and timing reference element 312 of FIG. 3B in some 802.11 embodiments. In various 802.11 embodiments, the initiator may comprise a station (STA) and the responder may comprise an access point (AP). As shown in FIG. 4A, the initiator first sends a time of flight (ToF) announcement 402 to the responder. ToF announcement 402 may comprise an information element defined for use by an initiator in an 802.11 network to initiate a timing information exchange with a responder. In some embodiments, ToF announcement 402 may comprise a modified version of an 802.11ac null data packet (NDP) announcement. ToF announcement 402 may comprise one or more timing announcement parameters such as will be discussed below with respect to FIG. 4B. Following a short interframe space (SIFS) 405, the initiator may send an 802.11 null data packet (NDP) 404 to the responder. In various embodiments, the NDP 404 may comprise a first set of one or more sounding preambles. In some embodiments, each of the first set of sounding preambles may comprise a long training field (LTF). Following a second SIFS 405, the responder may send a ToF response 410 to the initiator. ToF response 410 may comprise an information element defined for use by a responder in an 802.11 network to reply to a ToF announcement 402 received from an initiator in a timing information exchange, and may comprise one or more timing response parameters such as will be discussed below with respect to FIG. 4C. Following a third SIFS 405, the responder may send an NDP 412 to the initiator. In some embodiments, the NDP 412 may comprise a second set of one or more sounding preambles. In some embodiments, each of the second set of sounding preambles may comprise an LTF. The embodiments are not limited in this context.

Figure 4B:
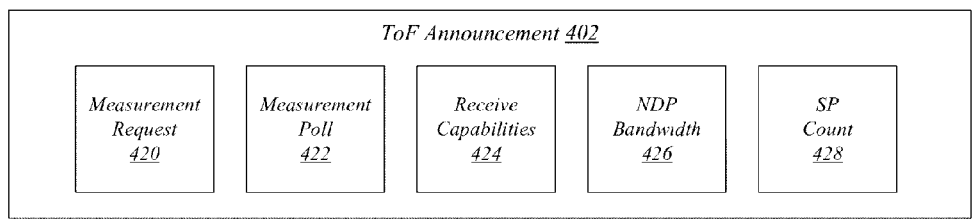
FIG. 4B illustrates one embodiment of a first timing announcement element.

FIG. 4B illustrates an embodiment of a ToF announcement such as may comprise an example of ToF announcement 402 of FIG. 4A in various embodiments. As shown in FIG. 4B, ToF announcement 402 comprises multiple timing announcement parameters, including measurement request parameter 420, measurement poll parameter 422, receive capabilities parameter 424, NDP bandwidth parameter 426, and sounding preamble (SP) count parameter 428. In some embodiments, measurement request parameter 420 may comprise one or more bits indicating whether a time of flight measurement is desired. It is to be understood that such a time of flight may comprise a time of flight according to IEEE 802.11-2012, IEEE 802.11ac Revision 5.0, and/or any predecessors, revisions, or variants thereof. In various embodiments, measurement poll parameter 422 may comprise one or more bits indicating whether a poll of a previous measurement is required. In some embodiments, receive capabilities parameter 424 may comprise one or more bits identifying a format of sounding preambles or other timing reference elements that the initiator is capable of properly receiving. For example, in the embodiment of FIG. 4A, receive capabilities parameter 424 may comprise one or more bits indicating that the initiator is capable of properly receiving sounding preambles comprising NDPs such as NDP 412. In various embodiments, NDP bandwidth parameter 426 may comprise one or more bits specifying a bandwidth for an NDP to be subsequently sent by the initiator. In some embodiments, SP count parameter 428 may comprise one or more bits specifying a number of sounding preambles to be comprised within the subsequent NDP.

It is to be understood that ToF announcement 402 may comprise other timing announcement parameters in various embodiments. Likewise, in some embodiments, ToF announcement 402 may not comprise all of the timing announcement parameters illustrated in FIG. 4B. For example, in various embodiments, ToF announcement 402 may not comprise a receive capabilities parameter 424. The embodiments are not limited in this context.

Figure 4C:
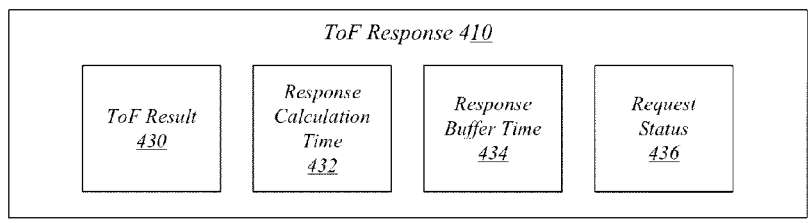
FIG. 4C illustrates one embodiment of a first timing response element.

FIG. 4C illustrates an embodiment of a ToF response such as may comprise an example of ToF response 410 of FIG. 4A in some embodiments. As shown in FIG. 4C, ToF response 410 comprises multiple timing response parameters, including ToF result parameter 430, response calculation time parameter 432, response buffer time parameter 434, and request status parameter 436. In various embodiments, ToF result parameter 430 may comprise one or more bits identifying a measured difference between a time of receipt of an NDP 404 and a time of transmission of an NDP 412 by the responder, or indicating that no such difference was measured. In some embodiments, response calculation time parameter 432 may comprise one or more bits indicating a minimum time required to generate a subsequent ToF response 410 comprising a measurement requested by ToF announcement 402. In various embodiments, response buffer time parameter 434 may comprise one or more bits indicating a maximum time that the responder will buffer the subsequent ToF response 410 before it is polled. In some embodiments, equal values of response calculation time parameter 432 and response buffer time parameter 434 may collectively identify a time at which the subsequent ToF response 410 will be ready and at which the subsequent ToF response 410 should be polled by the initiator. In various embodiments, request status parameter 436 may comprise one or more bits indicating whether the ToF announcement 402 can be accepted or whether it will be deferred, due to AP overload, for example. It is to be understood that ToF response 410 may comprise other timing response parameters in some embodiments. Likewise, in various embodiments, ToF response 410 may not comprise all of the timing response parameters illustrated in FIG. 4C. The embodiments are not limited in this context.

Figure 4D:
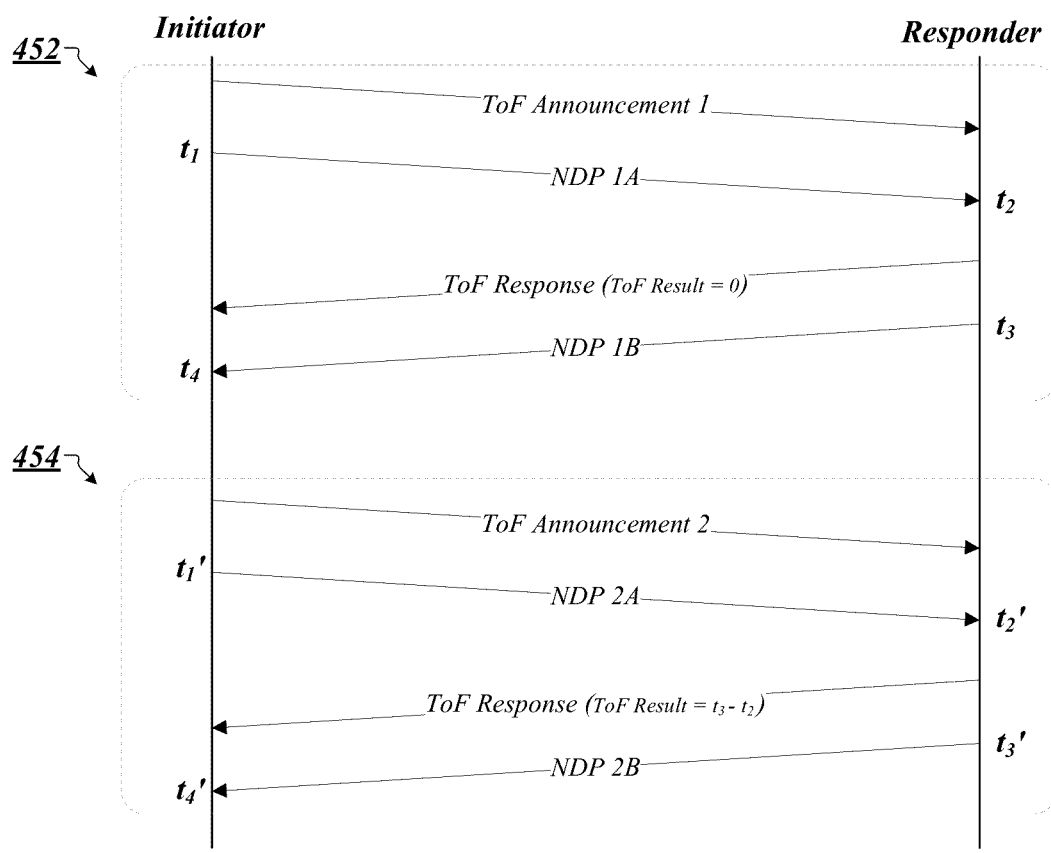
FIG. 4D illustrates one embodiment of a first transmission diagram.

FIG. 4D illustrates a transmission diagram 450 such as may comprise an example of transmissions exchanged by an initiator and a responder in some 802.11 embodiments. More particularly, FIG. 4D illustrates transmissions that may be comprised within an initial timing information exchange 452 and a subsequent timing information exchange 454 in various 802.11 embodiments corresponding to the elements described in FIGS. 4A-4C. As shown in FIG. 4D, during the initial timing information exchange 452, the initiator may send a first ToF announcement, and then may send an NDP 1A at time $t_1$. The responder may receive the NDP 1A at time $t_2$. Next, the responder may send a first ToF response, in which the ToF result parameter may comprise a value of zero indicating that a time of flight measurement has not yet been performed. At time $t_3$, the responder may send an NDP 1B, which the initiator may receive at time $t_4$.

During the subsequent timing information exchange 454, the initiator may send a second ToF announcement, and then may send an NDP 2A at time $t_1'$. The responder may receive the NDP 2A at time $t_2'$. Next, the responder may send a second ToF response, in which the ToF result parameter may comprise the difference between the times $t_3$ and $t_2$ determined during the initial timing information exchange 452. At time $t_3'$, the responder may send an NDP 2B, which the initiator may receive at time $t_4'$. The initiator may then determine a combined time of flight for NDPs 1A and 1B based on the times $t_1$, $t_2$, $t_3$, and $t_4$. More particularly, the initiator may determine the combined time of flight for NDPs 1A and 1B according to the equation:

$$\text{transit time} = (t_4 - t_1) - (t_3 - t_2); \qquad \text{Equation (1)}$$

where $(t_4 - t_1)$ indicates the total amount of time elapsed between transmission of NDP 1A and receipt of NDP 1B by the initiator, and $(t_3 - t_2)$ indicates an amount of time elapsed between receipt of NDP 1A and transmission of NDP 1B by the responder. Similarly, a combined time of flight for NDPs 2A and 2B may be determined according to Equation (1)

during a next timing information exchange, based on the times $t_1'$, $t_2'$, $t_3'$, and $t_4'$. The embodiments are not limited in this context.

Figure 5A:
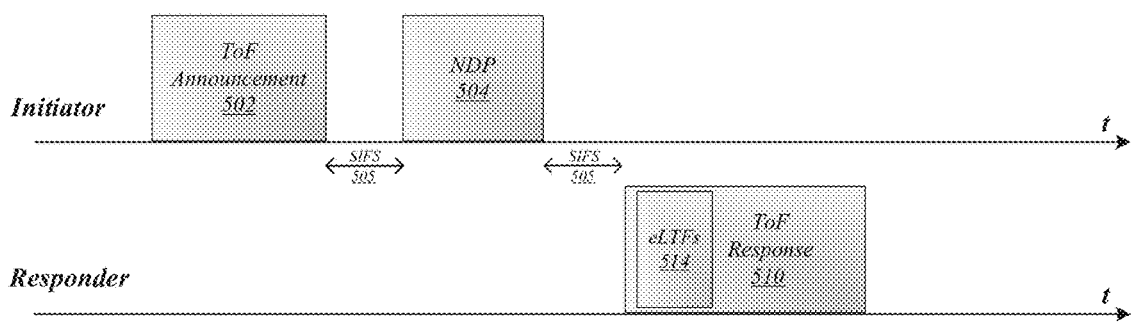
FIG. 5A illustrates one embodiment of a fifth timing information exchange.

FIG. 5A illustrates a fifth embodiment 500 of a timing information exchange that may be performed by an initiator and a responder, such as apparatus 200 and/or system 240 and communications device 251 of FIG. 2 respectively, in some embodiments. More particularly, FIG. 5A illustrates elements that may comprise timing announcement element 302, timing reference element 304, timing response element 310, and timing reference element 314 of FIG. 3C in various 802.11 embodiments. In various 802.11 embodiments, the initiator may comprise a station (STA) and the responder may comprise an access point (AP). As shown in FIG. 5A, the initiator first sends a time of flight (ToF) announcement 502 to the responder. ToF announcement 502 may comprise an information element defined for use by an initiator in an 802.11 network to initiate a timing information exchange with a responder, and may be the same as or similar to ToF announcement 402. In some embodiments of the example of FIG. 5A, however, the ToF announcement 502 may comprise a receive capabilities parameter indicating that the initiator is capable of properly receiving timing reference elements comprising IEEE 802.11 extended long training fields (eLTFs). Following a SIFS 505, the initiator may send an 802.11 null data packet (NDP) 504 to the responder. In various embodiments, the NDP 504 may comprise a first set of one or more sounding preambles. In some embodiments, each of the first set of sounding preambles may comprise an LTF. Following a second SIFS 505, the responder may send a ToF response 510 to the initiator. Like ToF response 410 of FIG. 4A, ToF response 510 may comprise an information element defined for use by a responder in an 802.11 network to reply to a ToF announcement 502 received from an initiator in a timing information exchange. In contrast to ToF response 410 of FIG. 4A, however, ToF response 510 may comprise a second set of one or more sounding preambles. The embodiments are not limited in this context.

Figure 5B:
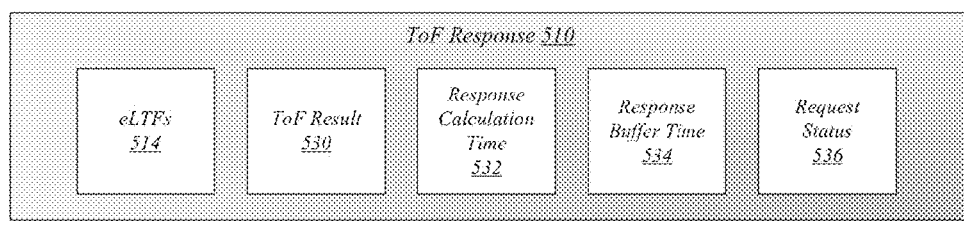
FIG. 5B illustrates one embodiment of a second timing response element.

FIG. 5B illustrates an embodiment of a ToF response such as may comprise an example of ToF response 510 of FIG. 5A in some embodiments. As shown in FIG. 5B, ToF response 510 comprises multiple timing response parameters, including ToF result parameter 530, response calculation time parameter 532, response buffer time parameter 534, and request status parameter 536. Each of these timing response parameters may be the same as or similar to their counterparts in ToF response 410 of FIG. 4C. ToF response 510 also comprises a second set of one or more sounding preambles comprising eLTFs 514, which may comprise an example of timing reference element 314 of FIG. 3C. In various embodiments, a responder may be operative to generate a ToF response 510 comprising eLTFs 514 when the initiator is capable of properly receiving eLTFs. For example, a responder that receives a ToF announcement in which a receive capabilities parameter indicates that the initiator is capable of properly receiving eLTFs may be operative to send a ToF response 510 comprising eLTFs 514. The embodiments are not limited in this context.

Figure 5C:
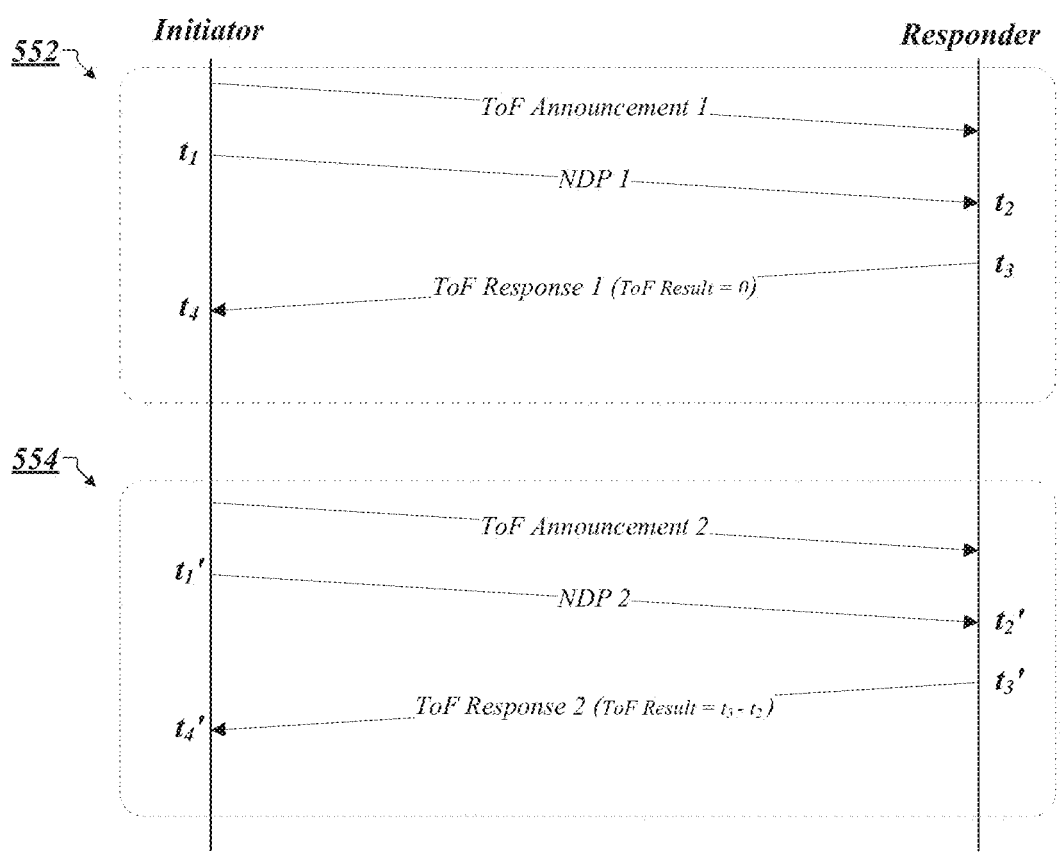
FIG. 5C illustrates one embodiment of a second transmission diagram.

FIG. 5C illustrates a transmission diagram 550 such as may comprise an example of transmissions exchanged by an initiator and a responder in some 802.11 embodiments. More particularly, FIG. 5C illustrates transmissions that may be comprised within an initial timing information exchange 552 and a subsequent timing information exchange 554 in various 802.11 embodiments corresponding to the elements described in FIGS. 5A-5B. As shown in FIG. 5C, during the initial timing information exchange 552, the initiator may send a first ToF announcement, and then may send an NDP 1 at time $t_1$. The responder may receive the NDP 1 at time $t_2$. Next, at time $t_3$, the responder may send a first ToF response, which may include one or more eLTFs and in which the ToF result parameter may comprise a value of zero indicating that a time of flight measurement has not yet been performed. The initiator may receive the first ToF response at time $t_4$.

During the subsequent timing information exchange 454, the initiator may send a second ToF announcement, and then may send an NDP 2A at time $t_1'$. The responder may receive the NDP 2A at time $t_2'$. Next, the responder may send a second ToF response, in which the ToF result parameter may comprise the difference between the times $t_3$ and $t_2$ determined during the initial timing information exchange 452. At time $t_3'$, the responder may send an NDP 2B, which the initiator may receive at time $t_4'$. The initiator may then determine a combined time of flight for NDP 1 and ToF response 1 based on the times $t_1$, $t_2$, $t_3$, and $t_4$, according to Equation (1). Similarly, a combined time of flight for NDP 2 and ToF response 2 may be determined according to Equation (1) during a next timing information exchange, based on the times $t_1'$, $t_2'$, $t_3'$, and $t_4'$. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
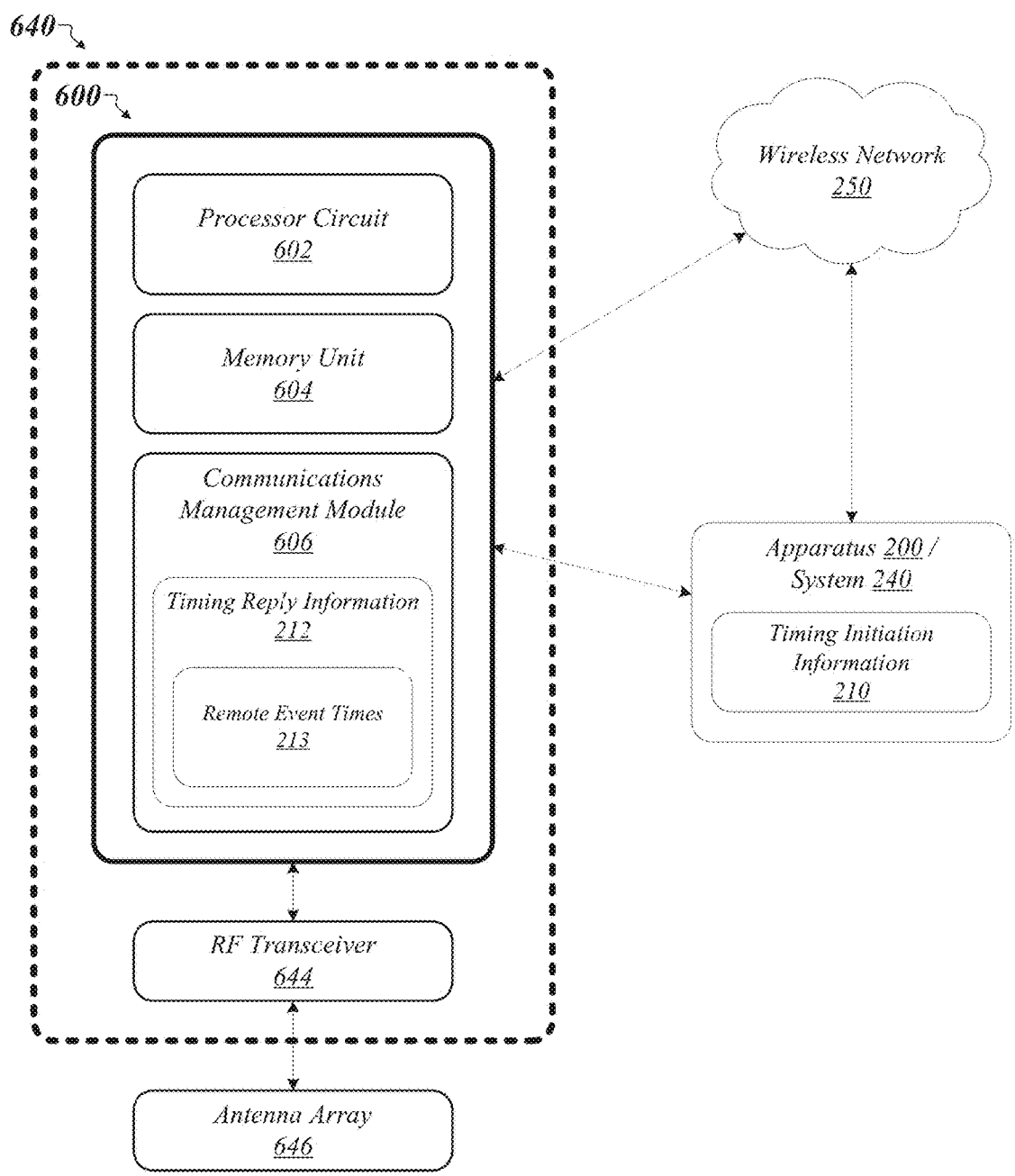
FIG. 6 illustrates one embodiment of a second apparatus and one embodiment of a second system

FIG. 6 illustrates a block diagram of an apparatus 600. More particularly, apparatus 600 may comprise an example of communications device 251 of FIG. 2 and/or responder 130 of FIG. 1 according to some embodiments. As shown in FIG. 6, apparatus 600 comprises multiple elements including a processor circuit 602, a memory unit 604, and a communications management module 606. The embodiments, however, are not limited to the type, number, or arrangement of elements shown in this figure.

In various embodiments, apparatus 600 may comprise processor circuit 602. Processor circuit 602 may be implemented using any processor or logic device, and may be the same as or similar to processor circuit 202 of FIG. 2. The embodiments are not limited in this context.

In some embodiments, apparatus 600 may comprise or be arranged to communicatively couple with a memory unit 604. Memory unit 604 may be implemented using any machine-readable or computer-readable media capable of storing data, including both volatile and non-volatile memory, and may be the same as or similar to memory unit 204 of FIG. 2. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is comprised within apparatus 600 in FIG. 6, memory unit 604 may be external to apparatus 600 in some embodiments. The embodiments are not limited in this context.

In various embodiments, apparatus 600 may comprise communications management module 606. Communications management module 606 may comprise logic, circuitry, and/or instructions operative to manage and/or configure communications by apparatus 600 over wireless network 250 of FIG. 2. In some embodiments, communications management module 606 may additionally or alternatively be operative to manage and/or configure communications over wireless network 250 by apparatus 200 and/or system 240 of FIG. 2. The embodiments are not limited in this context.

FIG. 6 also illustrates a block diagram of a system 640. System 640 may comprise any of the aforementioned elements of apparatus 600. System 640 may further comprise a radio frequency (RF) transceiver 644. RF transceiver 644 may include one or more radios capable of transmitting and receiving signals using various suitable wireless communications techniques, and may be the same as or similar to RF transceiver 244 of FIG. 2. The embodiments are not limited in this context.

In various embodiments, RF transceiver 644 may be coupled to an antenna array 646 comprising one or more antennas. In some embodiments, RF transceiver 644 may be operative to transmit and/or receive one or more signals over wireless network 650 via antenna array 646. In various embodiments, RF transceiver 644 may be operative to utilize antenna array 646 to simultaneously transmit and/or receive multiple sounding preambles. In some embodiments, RF transceiver 644 may be operative to transmit multiple sounding preambles in different respective directions using antenna array 646. In some embodiments, apparatus 600 and/or system 640 may be operative to send any one or more particular sounding preambles using a combination of two or more antennas of antenna array 646. The embodiments are not limited in this context.

In general operation, apparatus 600 and/or system 640 may be operative to communicate over wireless network 250 in order to determine an estimated location for apparatus 200 and/or system 240 of FIG. 2. In various embodiments, for example, apparatus 600 and/or system 640 may be operative to receive timing initiation information 210 from apparatus 200 and/or system 240 over wireless network 250, and to send timing reply information 212 to apparatus 200 and/or system 240 over the wireless network 250. In some embodiments, apparatus 600 and/or system 640 may be operative to determine a time of arrival of a sounding preamble associated with a strongest line of sight component among a first sounding preamble set comprised in the received timing initiation information 210, and to generate the timing reply information 212 based on that time of arrival. In various such embodiments, apparatus 600 and/or system 640 may be operative to determine remote event times 213 such as described above with respect to FIG. 2, and to send timing reply information 212 comprising those remote event times 213. Apparatus 200 and/or system 240 of FIG. 2 may then be operative to determine times of flight 214 based on the timing reply information 212 and/or the remote event times 213. The embodiments are not limited in this context.

Figure 7:
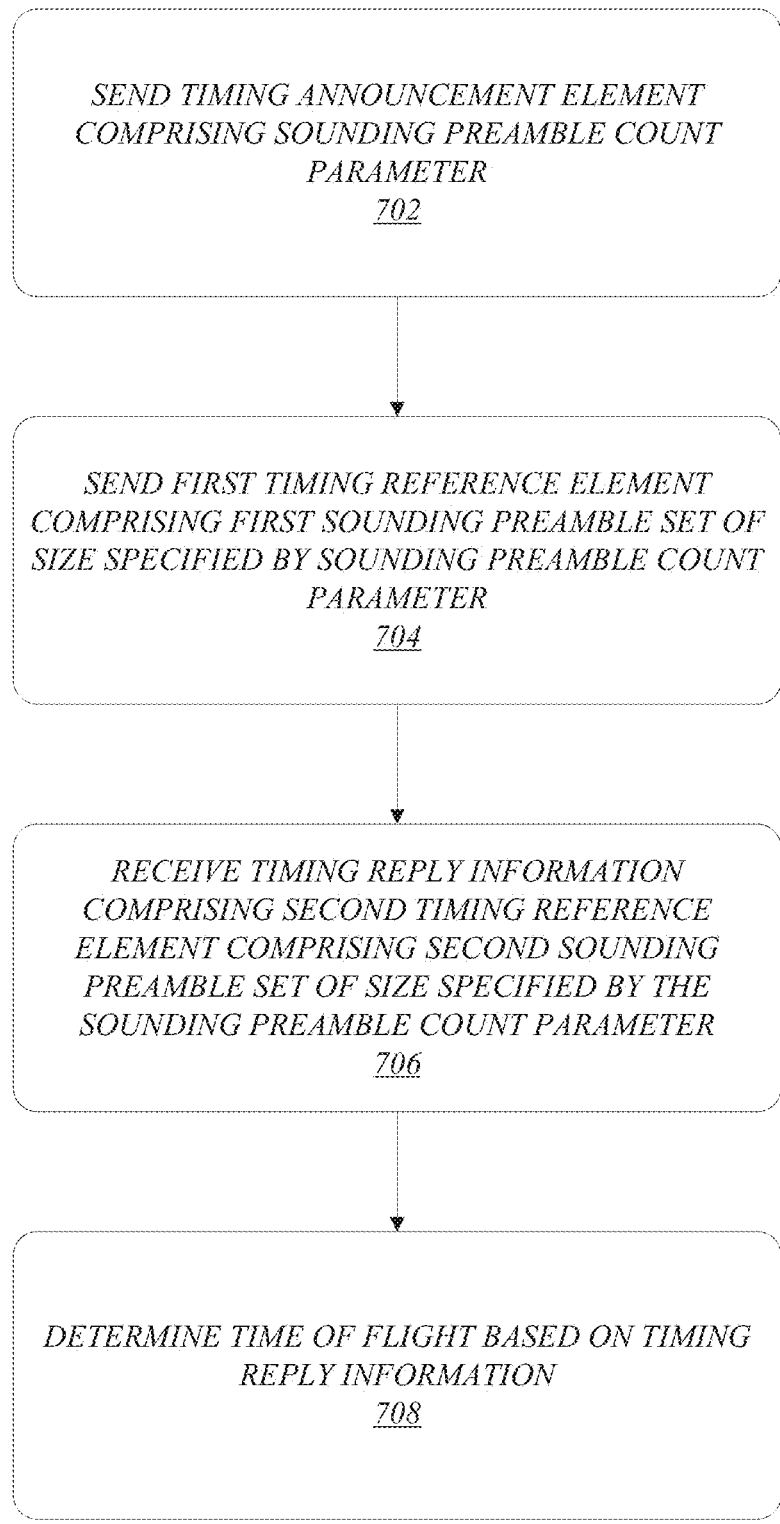
FIG. 7 illustrates one embodiment of a first logic flow.

FIG. 7 illustrates one embodiment of a logic flow 700, which may be representative of the operations executed by one or more embodiments described herein. More particularly, logic flow 700 may be representative of operations execution by apparatus 200 and/or system 240 of FIG. 2 according to some embodiments. As shown in logic flow 700, a timing announcement element comprising a sounding preamble count parameter may be sent at 702. For example, communications management module 206 of FIG. 2 may be operative to send timing initiation information 210 comprising a timing announcement element including a sounding preamble count parameter. At 704, a first timing reference element may be sent that comprises a first sounding preamble set of a size specified by the sounding preamble count parameter. For example, communications management module 206 of FIG. 2 may be operative to send timing initiation information 210 comprising a timing reference element including a number of sounding preambles specified by the sounding preamble count parameter. At 706, timing reply information may be received that comprises a second timing reference element including a second sounding preamble set of a size specified by the sounding preamble count parameter. For example, apparatus 200 and/or system 240 of FIG. 2 may be operative to receive timing reply information 212 comprising a timing reference element including a number of sounding preambles specified by the sounding preamble count parameter. At 708, a time of flight may be determined based on the timing reply information. For example, communications management module 206 of FIG. 2 may be operative to determine a time of flight 214 based on timing reply information 212. The embodiments are not limited to these examples.

Figure 8:
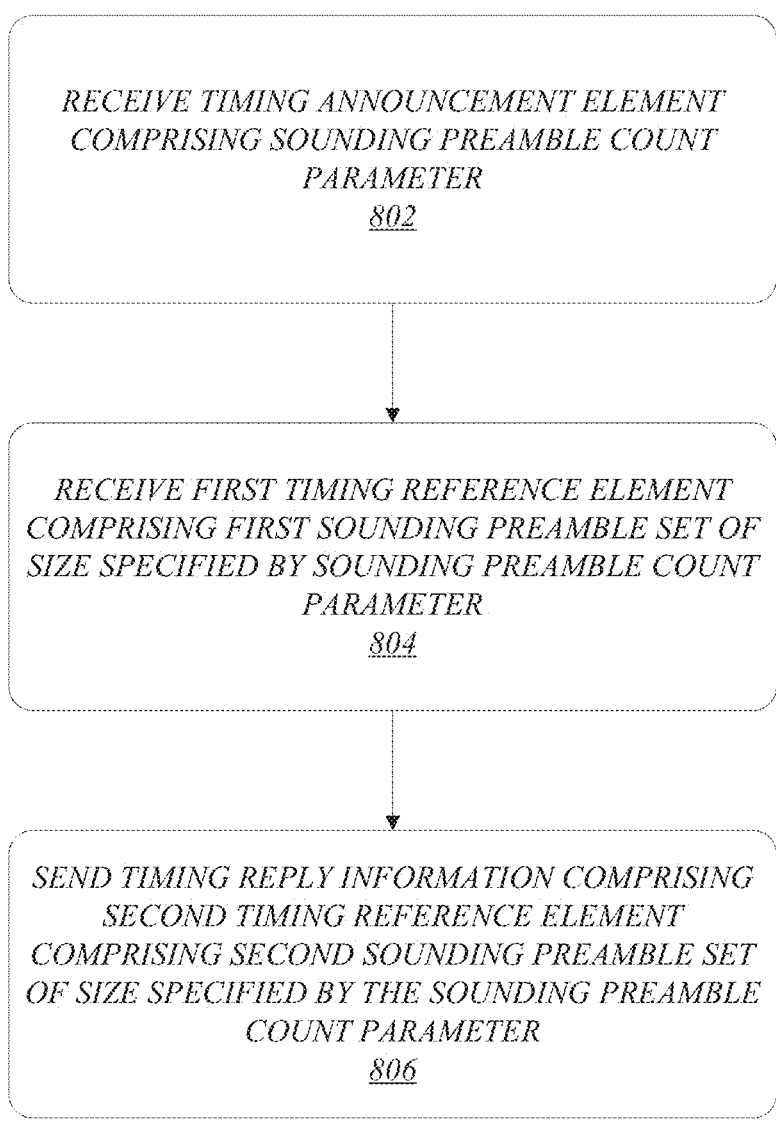
FIG. 8 illustrates one embodiment of a second logic flow.

FIG. 8 illustrates one embodiment of a logic flow 800, which may be representative of the operations executed by one or more embodiments described herein. More particularly, logic flow 800 may be representative of operations execution by apparatus 600 and/or system 640 of FIG. 6 according to various embodiments. As shown in logic flow 800, a timing announcement element comprising a sounding preamble count parameter may be received at 802. For example, apparatus 600 and/or system 640 of FIG. 6 may be operative to receive timing initiation information 210 comprising a timing announcement element including a sounding preamble count parameter. At 804, a first timing reference element may be received that comprises a first sounding preamble set of a size specified by the sounding preamble count parameter. For example, apparatus 600 and/or system 640 of FIG. 6 may be operative to receive timing initiation information 210 comprising a timing reference element including a number of sounding preambles specified by the sounding preamble count parameter. At 806, timing reply information may be sent that comprises a second timing reference element including a second sounding preamble set of a size specified by the sounding preamble count parameter. For example, communications management module 606 of FIG. 6 may be operative to send timing reply information 212 comprising a timing reference element including the number of sounding preambles specified by the sounding preamble count parameter. The embodiments are not limited to these examples.

Figure 9:
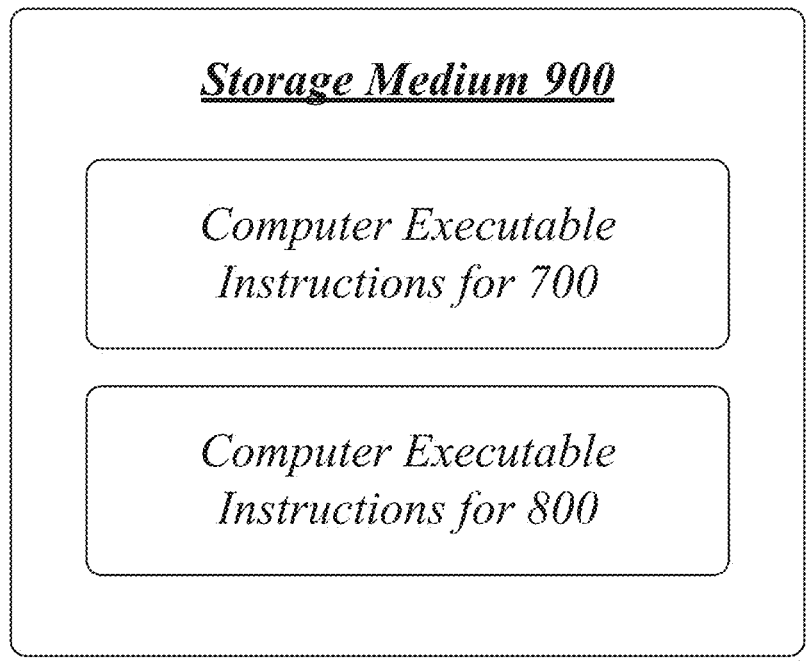
FIG. 9 illustrates one embodiment of a storage medium.

FIG. 9 illustrates an embodiment of a storage medium 900. The storage medium 900 may comprise an article of manufacture. In one embodiment, the storage medium 900 may comprise any non-transitory computer readable medium or machine readable medium, such as an optical, magnetic or semiconductor storage. The storage medium may store various types of computer executable instructions, such as instructions to implement one or both of logic flows 700 and 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 10:
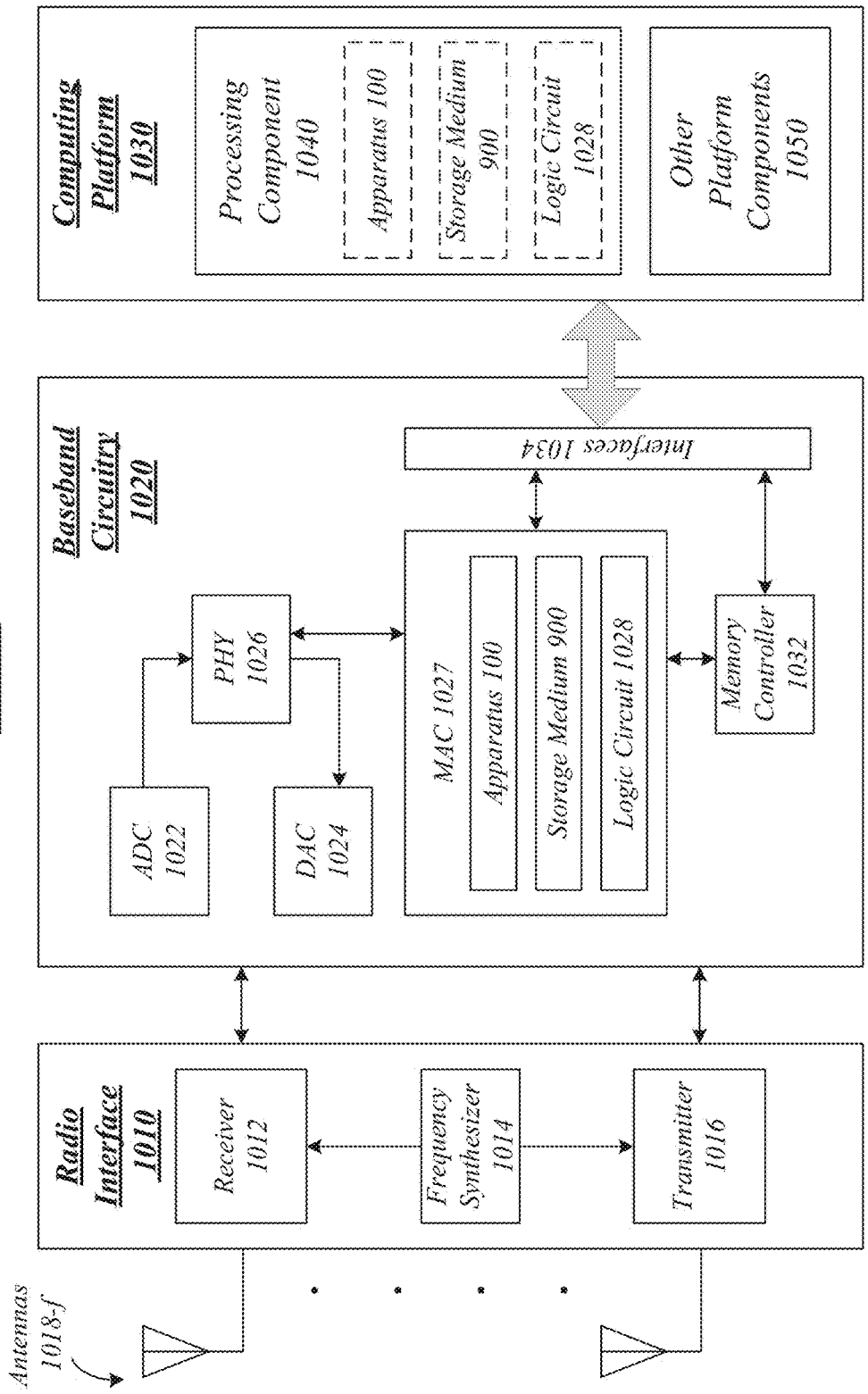
FIG. 10 illustrates one embodiment of a computing architecture.

FIG. 10 illustrates an embodiment of a communications device 1000 for use in a wireless network such as wireless network 100 of FIG. 1 and/or wireless network 250 of FIGS. 2 and 6. Device 1000 may implement, for example, apparatus 200, system 240, apparatus 600, system 640, storage medium 900 and/or a logic circuit 1028. The logic circuit 1028 may include physical circuits to perform operations described for apparatus 200 or apparatus 600, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for the apparatus 200, system 240, apparatus 600, system 640, storage medium 900 and/or logic circuit 1028 in a single computing entity, such as entirely within a single device. Alternatively, the device 1000 may distribute portions of the structure and/or operations for the apparatus 200, system 240, apparatus 600, system 640, storage medium 900 and/or logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the apparatus 200, system 240, apparatus 600, system 640, storage medium 900, and/or logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits (e.g., processor circuit 120), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-f) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is at least one machine-readable medium comprising a plurality of wireless network location instructions that, in response to being executed on a computing device, cause the computing device to: send a timing announcement element comprising a sounding preamble count parameter; send a first timing reference element comprising a first sounding preamble set of a size specified by the sounding preamble count parameter; receive timing reply information comprising a second timing reference element comprising a second sounding preamble set of the size specified by the sounding preamble count parameter; and determine a time of flight based on the timing reply information.

In Example 2, the at least one machine-readable medium of Example 1 may optionally comprise wireless network location instructions that, in response to being executed on a computing device, cause the computing device to cause transmission of at least one sounding preamble among the first sounding preamble set by a combination of two or more antennas.

In Example 3, the at least one machine-readable medium of any one of Examples 1 to 2 may optionally comprise wireless network location instructions that, in response to being executed on a computing device, cause the computing device to: send the first timing reference element to a remote computing device, the first timing reference element comprising a bandwidth specified by a bandwidth parameter in the timing announcement element; and receive the second timing reference element from the remote computing device, the second timing reference element comprising the bandwidth specified by the bandwidth parameter.

In Example 4, the first timing reference element of any one of Examples 1 to 3 may optionally comprise a null data packet.

In Example 5, the first sounding preamble set of any one of Examples 1 to 4 may optionally comprise one or more long training fields.

In Example 6, the second timing reference element of any one of Examples 1 to 5 may optionally comprise a null data packet.

In Example 7, the second sounding preamble set of any one of Examples 1 to 6 may optionally comprise one or more long training fields.

In Example 8, the second sounding preamble set of any one of Examples 1 to 5 may optionally comprise one or more extended long training fields.

In Example 9, the timing announcement element of any one of Examples 1 to 8 may optionally comprise a receive capabilities parameter indicating a sounding preamble format for the second sounding preamble set.

In Example 10 the at least one machine-readable medium any one of Examples 1 to 9 may optionally comprise wireless network location instructions that, in response to being executed on a computing device, cause the computing device to cause transmission of each sounding preamble in the first sounding preamble set using a different antenna.

Example 11 is a wireless network location apparatus, comprising: circuitry; and a communications management module for execution on the circuitry to send a timing announcement element comprising a sounding preamble count parameter indicating a number of sounding preambles, send a null data element comprising a number of sounding preambles equal to the sounding preamble count parameter, receive timing reply information comprising the number of sounding preambles equal to the sounding preamble count parameter, and determine a time of flight based on the timing reply information.

In Example 12, the communications management module of Example 11 may optionally be for execution on the circuitry to cause transmission of at least one sounding preamble by a combination of two or more antennas.

In Example 13, the communications management module of any one of Examples 11 to 12 may optionally be for execution on the circuitry to determine a bandwidth parameter indicating a bandwidth for the null data element, send the bandwidth parameter to a remote computing device, send the null data element based on the bandwidth parameter, and receive a timing reference element comprising the bandwidth indicated by the bandwidth parameter from the remote computing device.

In Example 14, the timing reply information of any one of Examples 11 to 13 may optionally comprise a number of extended long training fields equal to the sounding preamble count parameter.

In Example 15, the sounding preambles of the timing reply information of any one of Examples 11 to 13 may optionally comprise one or more long training fields.

In Example 16, the sounding preambles of the null data element of any one of Examples 11 to 15 may optionally comprise one or more long training fields.

In Example 17, the sounding preambles of the timing reply information of any one of Examples 11 to 16 may optionally be comprised in a timing response element.

In Example 18, the sounding preambles of the timing reply information of any one of Examples 11 to 17 may optionally be comprised in a null data packet.

In Example 19, the timing reply information of any one of Examples 11 to 18 may optionally comprise a response buffer time parameter indicating a maximum time that a subsequent timing response element will be buffered.

In Example 20, the wireless network location apparatus of any one of Examples 11 to 19 may optionally comprise an antenna array, and the communications management module may optionally be for execution on the circuitry to cause transmission of each sounding preamble in the null data element using a different antenna of the antenna array.

In Example 21, a wireless network location apparatus comprises: means for sending a timing announcement element comprising a sounding preamble count parameter; means for sending a first timing reference element comprising a first sounding preamble set of a size specified by the sounding preamble count parameter; means for receiving timing reply information comprising a second timing reference element comprising a second sounding preamble set of the size specified by the sounding preamble count parameter; and means for determining, by a processor circuit, a time of flight based on the timing reply information.

In Example 22, the wireless network location apparatus of Example 21 may optionally comprise means for transmitting at least one sounding preamble among the first sounding preamble set by a combination of two or more antennas.

In Example 23, the wireless network location apparatus of any one of Examples 21 to 22 may optionally comprise: means for sending the first timing reference element to a remote computing device, the first timing reference element comprising a bandwidth specified by a bandwidth parameter in the timing announcement element; and means for receiving the second timing reference element from the remote computing device, the second timing reference element comprising the bandwidth specified by the bandwidth parameter.

In Example 24, the first timing reference element of any one of Examples 21 to 23 may optionally comprise a null data packet.

In Example 25, the first sounding preamble set of any one of Examples 21 to 24 may optionally comprise one or more long training fields.

In Example 26, the second timing reference element of any one of Examples 21 to 25 may optionally comprise a null data packet.

In Example 27, the second sounding preamble set of any one of Examples 21 to 26 may optionally comprise one or more long training fields.

In Example 28, the second sounding preamble set of any one of Examples 21 to 25 may optionally comprise one or more extended long training fields.

In Example 29, the timing announcement element of any one of Examples 21 to 28 may optionally comprise a receive capabilities parameter indicating a sounding preamble format for the second sounding preamble set.

In Example 30, the wireless network location apparatus of any one of Examples 21 to 29 may optionally comprise means for transmitting each sounding preamble in the first sounding preamble set using a different antenna.

In Example 31, a wireless network location method comprises: sending a timing announcement element comprising a sounding preamble count parameter; sending a first timing reference element comprising a first sounding preamble set of a size specified by the sounding preamble count parameter; receiving timing reply information comprising a second timing reference element comprising a second sounding preamble set of the size specified by the sounding preamble count parameter; and determining, by a processor circuit, a time of flight based on the timing reply information.

In Example 32, the wireless network location method of Example 31 may optionally comprise transmitting at least one sounding preamble among the first sounding preamble set by a combination of two or more antennas.

In Example 33, the wireless network location method of any one of Examples 31 to 32 may optionally comprise: sending the first timing reference element to a remote computing device, the first timing reference element comprising a bandwidth specified by a bandwidth parameter in the timing announcement element; and receiving the second timing reference element from the remote computing device, the second timing reference element comprising the bandwidth specified by the bandwidth parameter.

In Example 34, the first timing reference element of any one of Examples 31 to 33 may optionally comprise a null data packet.

In Example 35, the first sounding preamble set of any one of Examples 31 to 34 may optionally comprise one or more long training fields.

In Example 36, the second timing reference element of any one of Examples 31 to 35 may optionally comprise a null data packet.

In Example 37, the second sounding preamble set of any one of Examples 31 to 36 may optionally comprise one or more long training fields.

In Example 38, the second sounding preamble set of any one of Examples 31 to 35 may optionally comprise one or more extended long training fields.

In Example 39, the timing announcement element of any one of Examples 31 to 38 may optionally comprise a receive capabilities parameter indicating a sounding preamble format for the second sounding preamble set.

In Example 40, the wireless network location method of any one of Examples 31 to 39 may optionally comprise transmitting each sounding preamble in the first sounding preamble set using a different antenna.

In Example 41, at least one machine-readable medium may optionally comprise a plurality of instructions that, in response to being executed on a computing device, cause the computing device to perform a wireless network location method according to any one of Examples 31 to 40.

In Example 42, an apparatus may optionally comprise means for performing a wireless network location method according to any one of Examples 31 to 40.

In Example 43, a communications device may optionally be arranged to perform a wireless network location method according to any one of Examples 31 to 40.

In Example 44, at least one machine-readable medium comprising a plurality of wireless network location instructions that, in response to being executed on a computing device, cause the computing device to: receive a timing announcement element comprising a sounding preamble count parameter; receive a first timing reference element comprising a first sounding preamble set of a size specified by the sounding preamble count parameter; and send timing reply information comprising a second timing reference element comprising a second sounding preamble set of the size specified by the sounding preamble count parameter.

In Example 45, the at least one machine-readable medium of Example 44 may optionally comprise wireless network location instructions that, in response to being executed on a computing device, cause the computing device to: determine a time of arrival of a sounding preamble associated with a strongest line of sight component among the first sounding preamble set; and generate the timing reply information based on the time of arrival.

In Example 46, the timing announcement element of any one of Examples 44 to 45 may optionally comprise a bandwidth parameter, and the first timing reference element and the second timing reference element may each comprise a bandwidth specified by the bandwidth parameter.

In Example 47, the second sounding preamble set of any one of Examples 44 to 46 may optionally comprise a set of extended long training fields.

In Example 48, the first timing reference element of any one of Examples 44 to 47 may optionally comprise a null data packet.

In Example 49, the second timing reference element of any one of Examples 44 to 48 may optionally comprise a null data packet.

In Example 50, the first sounding preamble set of any one of Examples 44 to 49 may optionally comprise one or more long training fields.

In Example 51, the second sounding preamble set of any one of Examples 44 to 50 may optionally comprise one or more long training fields.

In Example 52, the timing announcement element of any one of Examples 44 to 51 may optionally comprise a receive capabilities parameter indicating a sounding preamble format for the second sounding preamble set.

In Example 53, the at least one machine-readable medium of any one of Examples 44 to 52 may optionally comprise wireless network location instructions that, in response to being executed on a computing device, cause the computing device to cause transmission of each sounding preamble in the second sounding preamble set using a different antenna.

Example 54 is a wireless network location apparatus, comprising: circuitry; and a communications management module for execution on the circuitry to receive a timing announcement element comprising a sounding preamble count parameter indicating a number of sounding preambles and a receive capabilities parameter indicating a sounding preamble format, receive a null data element comprising a number of sounding preambles equal to the sounding preamble count parameter, and send timing reply information comprising a set of sounding preambles of the sounding preamble format indicated by the receive capabilities parameter, the set of sounding preambles comprising a number of sounding preambles equal to the sounding preamble count parameter.

In Example 55, the communications management module may optionally be for execution on the circuitry to determine a time of arrival of a sounding preamble associated with a strongest line of sight component among the sounding preambles comprised in the null data element, and generate the timing reply information based on the time of arrival.

In Example 56, the timing announcement element of any one of Examples 54 to 55 may optionally comprise a bandwidth parameter, and the null data element may optionally comprise a bandwidth specified by the bandwidth parameter.

In Example 57, the set of sounding preambles of any one of Examples 54 to 56 may optionally comprise a set of long training fields.

In Example 58, the sounding preambles of the timing reply information of any one of Examples 54 to 57 may optionally be comprised in a null data packet.

In Example 59, the set of sounding preambles of any one of Examples 54 to 58 may optionally comprise a set of extended long training fields.

In Example 60, the communications management module of any one of Examples 54 to 59 may optionally be for execution on the circuitry to cause transmission of at least one sounding preamble by a combination of two or more antennas.

In Example 61, the sounding preambles of the null data element of any one of Examples 54 to 60 may optionally comprise one or more long training fields.

In Example 62, the timing reply information of any one of Examples 54 to 61 may optionally comprise a response buffer time parameter indicating a maximum time that a subsequent timing response element will be buffered.

In Example 63, the wireless network location apparatus of any one of Examples 54 to 62 may optionally comprise an antenna array, and the communications management module may optionally be for execution on the circuitry to cause transmission of each sounding preamble in the set of sounding preambles using a different antenna of the antenna array.

In Example 64, a wireless network location apparatus comprises: means for receiving a timing announcement element comprising a sounding preamble count parameter; means for receiving a first timing reference element comprising a first sounding preamble set of a size specified by the sounding preamble count parameter; and means for sending timing reply information comprising a second timing reference element comprising a second sounding preamble set of the size specified by the sounding preamble count parameter.

In Example 65, the wireless network location apparatus of Example 64 may optionally comprise: means for determining a time of arrival of a sounding preamble associated with a strongest line of sight component among the first sounding preamble set; and means for generating the timing reply information based on the time of arrival.

In Example 66, the timing announcement element of any one of Examples 64 to 65 may optionally comprise a bandwidth parameter, and the first timing reference element and the second timing reference element may each comprise a bandwidth specified by the bandwidth parameter.

In Example 67, the second sounding preamble set of any one of Examples 64 to 66 may optionally comprise a set of extended long training fields.

In Example 68, the first timing reference element of any one of Examples 64 to 67 may optionally comprise a null data packet.

In Example 69, the second timing reference element of any one of Examples 64 to 68 may optionally comprise a null data packet.

In Example 70, the first sounding preamble set of any one of Examples 64 to 69 may optionally comprise one or more long training fields.

In Example 71, the second sounding preamble set of any one of Examples 64 to 70 may optionally comprise one or more long training fields.

In Example 72, the timing announcement element of any one of Examples 64 to 71 may optionally comprise a receive capabilities parameter indicating a sounding preamble format for the second sounding preamble set.

In Example 73, the wireless network location apparatus of any one of Examples 64 to 72 may optionally comprise means for transmitting each sounding preamble in the second sounding preamble set using a different antenna.

Example 74 is a wireless network location method, comprising: receiving a timing announcement element comprising a sounding preamble count parameter; receiving a first timing reference element comprising a first sounding preamble set of a size specified by the sounding preamble count parameter; and sending timing reply information comprising a second timing reference element comprising a second sounding preamble set of the size specified by the sounding preamble count parameter.

In Example 75, the wireless network location method of Example 74 may optionally comprise: determining a time of arrival of a sounding preamble associated with a strongest line of sight component among the first sounding preamble set; and generating the timing reply information based on the time of arrival.

In Example 76, the timing announcement element of any one of Examples 74 to 75 may optionally comprise a bandwidth parameter, and the first timing reference element and the second timing reference element may each comprise a bandwidth specified by the bandwidth parameter.

In Example 77, the second sounding preamble set of any one of Examples 74 to 76 may optionally comprise a set of extended long training fields.

In Example 78, the first timing reference element of any one of Examples 74 to 77 may optionally comprise a null data packet.

In Example 79, the second timing reference element of any one of Examples 74 to 78 may optionally comprise a null data packet.

In Example 80, the first sounding preamble set of any one of Examples 74 to 79 may optionally comprise one or more long training fields.

In Example 81, the second sounding preamble set of any one of Examples 74 to 80 may optionally comprise one or more long training fields.

In Example 82, the timing announcement element of any one of Examples 74 to 81 may optionally comprise a receive capabilities parameter indicating a sounding preamble format for the second sounding preamble set.

In Example 83, the wireless network location method of any one of Examples 74 to 82 may optionally comprise transmitting each sounding preamble in the second sounding preamble set using a different antenna.

In Example 84, at least one machine-readable medium may optionally comprise a plurality of instructions that, in response to being executed on a computing device, cause the computing device to perform a wireless network location method according to any one of claims 74 to 83.

In Example 85, an apparatus, may optionally comprise means for performing a wireless network location method according to any one of claims 74 to 83.

In Example 86, a communications device may optionally be arranged to perform a wireless network location method according to any one of claims 74 to 83.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of wireless network location instructions that, in response to being executed on a computing device, cause the computing device to:
send a timing announcement element comprising a sounding preamble count parameter;
send a first timing reference element comprising a first sounding preamble set of a size specified by the sounding preamble count parameter;
receive timing reply information comprising a second timing reference element comprising a second sounding preamble set of the size specified by the sounding preamble count parameter and a response buffer time parameter that indicates a maximum buffering time that a subsequent timing response element will be buffered; and
determine a time of flight based on the timing reply information.

2. The at least one non-transitory machine-readable medium of claim 1, comprising wireless network location instructions that, in response to being executed on a computing device, cause the computing device to cause transmission of at least one sounding preamble among the first sounding preamble set by a combination of two or more antennas.

3. The at least one non-transitory machine-readable medium of claim 1, comprising wireless network location instructions that, in response to being executed on a computing device, cause the computing device to:
send the first timing reference element to a remote computing device, the first timing reference element comprising a bandwidth specified by a bandwidth parameter in the timing announcement element; and
receive the second timing reference element from the remote computing device, the second timing reference element comprising the bandwidth specified by the bandwidth parameter.

4. The at least one non-transitory machine-readable medium of claim 1, the first timing reference element comprising a null data packet.

5. The at least one non-transitory machine-readable medium of claim 1, the second timing reference element comprising a null data packet.

6. The at least one non-transitory machine-readable medium of claim 1, the first sounding preamble set comprising one or more long training fields.

7. The at least one non-transitory machine-readable medium of claim 1, the second sounding preamble set comprising one or more extended long training fields.

8. The at least one non-transitory machine-readable medium of claim 1, the timing announcement element comprising a receive capabilities parameter indicating a sounding preamble format for the second sounding preamble set.

9. A wireless network location apparatus, comprising:
circuitry; and
a communications management module for execution on the circuitry to send a timing announcement element comprising a sounding preamble count parameter indicating a number of sounding preambles, send a null data element comprising a number of sounding preambles equal to the sounding preamble count parameter, receive timing reply information comprising the number of sounding preambles equal to the sounding preamble count parameter and a response buffer time parameter that indicates a maximum buffering time that a subsequent timing response element will be buffered, and determine a time of flight based on the timing reply information.

10. The wireless network location apparatus of claim 9, the communications management module for execution on the circuitry to cause transmission of at least one sounding preamble by a combination of two or more antennas.

11. The wireless network location apparatus of claim 9, the communications management module for execution on the circuitry to determine a bandwidth parameter indicating a bandwidth for the null data element, send the bandwidth parameter to a remote computing device, send the null data element based on the bandwidth parameter, and receive a timing reference element comprising the bandwidth indicated by the bandwidth parameter from the remote computing device.

12. The wireless network location apparatus of claim 9, the timing reply information comprising a number of extended long training fields equal to the sounding preamble count parameter.

13. The wireless network location apparatus of claim 9, the sounding preambles of the null data element comprising one or more long training fields.

14. The wireless network location apparatus of claim 9, the sounding preambles of the timing reply information comprised in the timing response element.

15. The wireless network location apparatus of claim 9, the sounding preambles of the timing reply information comprised in a null data packet.

16. The wireless network location apparatus of claim 9, comprising an antenna array, the communications management module for execution on the circuitry to cause transmission of each sounding preamble in the null data element using a different antenna of the antenna array.

17. A wireless network location method, comprising:
sending a timing announcement element comprising a sounding preamble count parameter;
sending a first timing reference element comprising a first sounding preamble set of a size specified by the sounding preamble count parameter;
receiving timing reply information comprising a second timing reference element comprising a second sounding preamble set of the size specified by the sounding preamble count parameter and a response buffer time parameter that indicates a maximum buffering time that a subsequent timing response element will be buffered; and
determining, by a processor circuit, a time of flight based on the timing reply information.

18. The wireless network location method of claim 17, comprising transmitting at least one sounding preamble among the first sounding preamble set by a combination of two or more antennas.

19. The wireless network location method of claim 17, comprising:
sending the first timing reference element to a remote computing device, the first timing reference element comprising a bandwidth specified by a bandwidth parameter in the timing announcement element; and
receiving the second timing reference element from the remote computing device, the second timing reference element comprising the bandwidth specified by the bandwidth parameter.

20. The wireless network location method of claim 17, the first timing reference element comprising a null data packet.

21. The wireless network location method of claim 17, the second timing reference element comprising a null data packet.

22. The wireless network location method of claim 17, the first sounding preamble set comprising one or more long training fields.

23. The wireless network location method of claim 17, the second sounding preamble set comprising one or more extended long training fields.

24. The wireless network location method of claim 17, comprising transmitting each sounding preamble in the first sounding preamble set using a different antenna.

* * * * *